United States Patent
Hall et al.

(10) Patent No.: US 11,954,027 B2
(45) Date of Patent: Apr. 9, 2024

(54) PARASITIC COMMANDS FOR EQUALIZING LOGICAL UNIT CAPACITY IN ASYMMETRIC MULTIPLE ACTUATOR HARD DISK DRIVE

(71) Applicant: Western Digital Technologies, Inc., San Jose, CA (US)

(72) Inventors: David Hall, Rochester, MN (US); Ali Khalili, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/678,765

(22) Filed: Feb. 23, 2022

(65) Prior Publication Data

US 2023/0267076 A1    Aug. 24, 2023

(51) Int. Cl.
*G06F 12/06* (2006.01)
*G06F 3/06* (2006.01)

(52) U.S. Cl.
CPC ............ *G06F 12/063* (2013.01); *G06F 3/061* (2013.01); *G06F 3/0635* (2013.01); *G06F 3/0676* (2013.01)

(58) Field of Classification Search
CPC ...... G06F 12/063; G06F 3/061; G06F 3/0635; G06F 3/0676
See application file for complete search history.

(56) References Cited

U.S. PATENT DOCUMENTS

| | | | |
|---|---|---|---|
| 6,005,743 A | 12/1999 | Price et al. | |
| 6,327,638 B1 | 12/2001 | Kirby | |
| 7,174,414 B2 | 2/2007 | Nguyen et al. | |
| 9,830,939 B1 | 11/2017 | Hamilton | |
| 10,090,010 B1 | 10/2018 | Erden | |
| 10,629,238 B1 * | 4/2020 | Buch | G11B 20/1217 |
| 10,664,172 B1 * | 5/2020 | Trantham | G06F 3/0613 |
| 10,802,739 B1 | 10/2020 | Weber et al. | |

(Continued)

FOREIGN PATENT DOCUMENTS

EP    0644486 A2    3/1995

OTHER PUBLICATIONS

Rosenfeld, K., Sencar, H. T., & Memon, N. (Jun. 2007). Volleystore: a parasitic storage framework. In 2007 IEEE SMC Information Assurance and Security Workshop (pp. 67-75). IEEE.*

(Continued)

*Primary Examiner* — Tracy A Warren
(74) *Attorney, Agent, or Firm* — John D. Henkhaus

(57) ABSTRACT

A multiple-actuator hard disk drive includes a first actuator associated with a first logical unit and configured to operate on a first set of disk surfaces, a second actuator associated with a second logical unit and configured to operate on a second set of disk surfaces greater than the first set, and a controller accessing a mapping of logical memory addresses to physical memory locations. The mapping maps the first logical unit to the physical memory locations of the first set of surfaces and a parasitic portion of the second set of surfaces, and maps the second logical unit to the physical memory locations of the second set of surfaces exclusive of the parasitic portion of the second set of surfaces. Thus, data transfer commands performed on the parasitic portion are executed by one actuator while credit is given to the logical unit associated with the other actuator.

23 Claims, 8 Drawing Sheets

(56) References Cited

U.S. PATENT DOCUMENTS

| | | | |
|---|---|---|---|
| 10,803,893 B1 | 10/2020 | Zhang et al. | |
| 2019/0310780 A1* | 10/2019 | Gholamipour | G06F 3/0679 |
| 2020/0020357 A1* | 1/2020 | Dunn | G11B 5/5569 |
| 2021/0240386 A1* | 8/2021 | Bent | G06F 11/2094 |

OTHER PUBLICATIONS

Chen, J., Zhou, J., & Zhou, G. (2010). Characteristics analysis of parasitic storage. Frontiers of Optoelectronics in China, 3(2), 198-204.*

Barabasi, A. L., Freeh, V. W., Jeong, H., & Brockman, J. B. (2001). Parasitic computing. Nature, 412(6850), 894-897.*

Tzolov, S., & Bills, D. (Oct. 2011). Parasitic databases: an investigation. In Proceedings of the 2011 conference on Information technology education (pp. 303-304).*

GitHub (2013) HiveMind: distributed file storage using JavaScript botnets. Available: https://github.com/seantmalone/HiveMind.*

Israel Patent Office (ISA/IL), PCT International Search Report and Written Opinion for counterpart International application No. PCT/US2021/030426, dated Sep. 5, 2022, 8 pages.

* cited by examiner

PARASITIC COMMANDS FOR EQUALIZING LOGICAL UNIT CAPACITY IN ASYMMETRIC MULTIPLE ACTUATOR HARD DISK DRIVE

FIELD OF EMBODIMENTS

Embodiments of the invention may relate generally to data storage devices such as hard disk drives and particularly to approaches to equalizing logical unit capacity in an asymmetric multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. In recent years the growth in areal density has not kept pace with the trends of years past. This has shifted the burden on the mechanics to boost capacity increases by increasing the number of disks within the prescribed form factor. However, the performance of high-capacity HDDs has not necessarily scaled up commensurately with the increases in capacity. This has led to the need to develop and implement various means to increase high-capacity HDD performance. As these HDDs are primarily used for near line storage in data centers in hyper-scale environments, the performance of these high-capacity drives also has to satisfy the IOPS (Input/Output Operations Per Second) density requirements (in some instances, similarly referred to as IOPS/TB) to minimize latency. This demand has led to a shift to multiple actuators for providing parallel access to data.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to equalizing the logical unit capacity in an asymmetric multi-actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity HDDs has not necessarily scaled up commensurately with increases in storage capacity, and the pressure to increase the performance (e.g., IOPS) by reducing the latencies for data operations of high-capacity HDDs has become even stronger as capacities of HDDs continue to increase. As mentioned, one possible approach to increasing HDD performance is the implementation of multi-actuator systems, in which multiple independently operating actuators are employed to concurrently read from and/or write to multiple recording disks of a disk stack.

Figure 1:
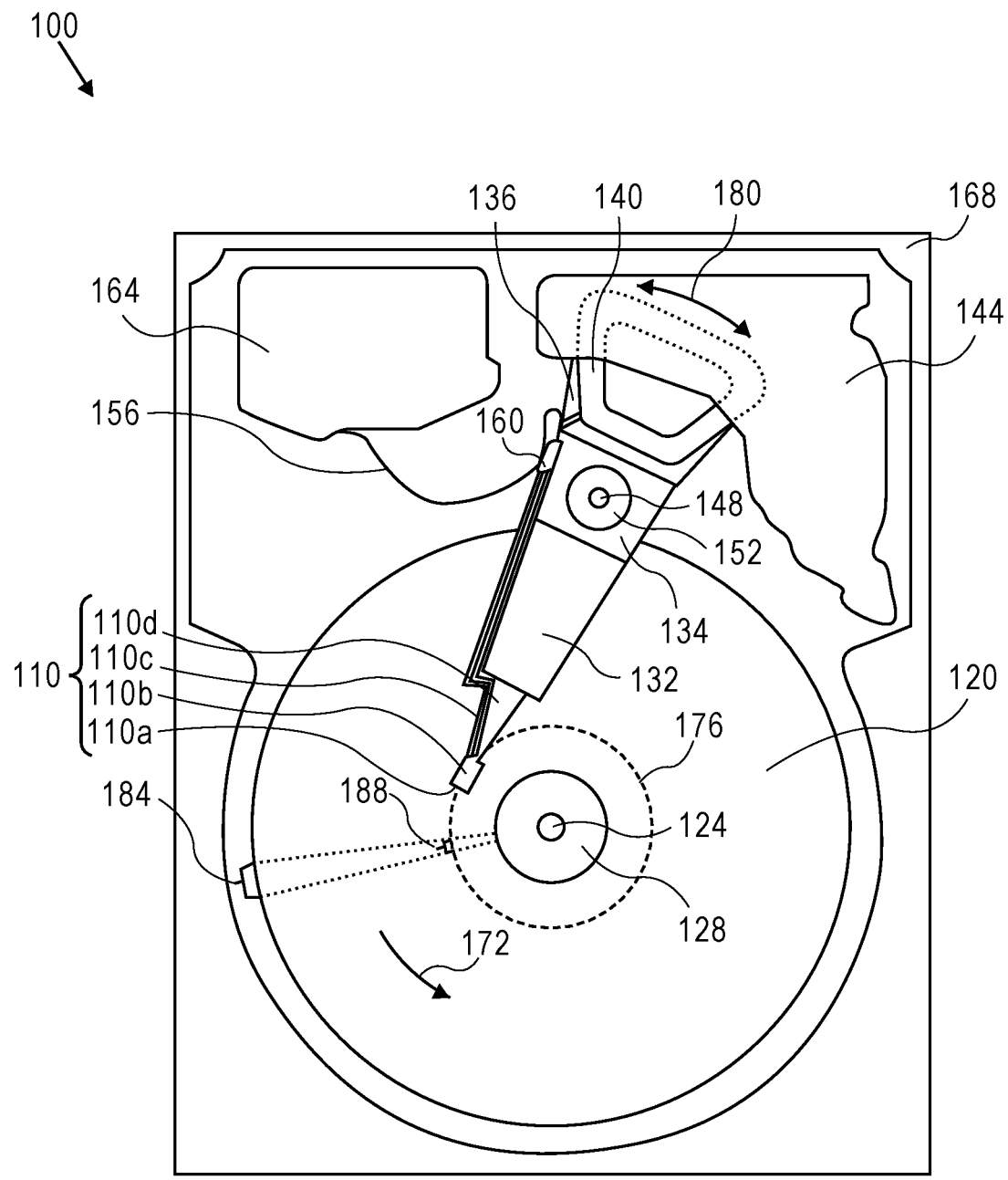
FIG. 1 is a plan view illustrating a hard disk drive, according to an embodiment.
Figure 2:
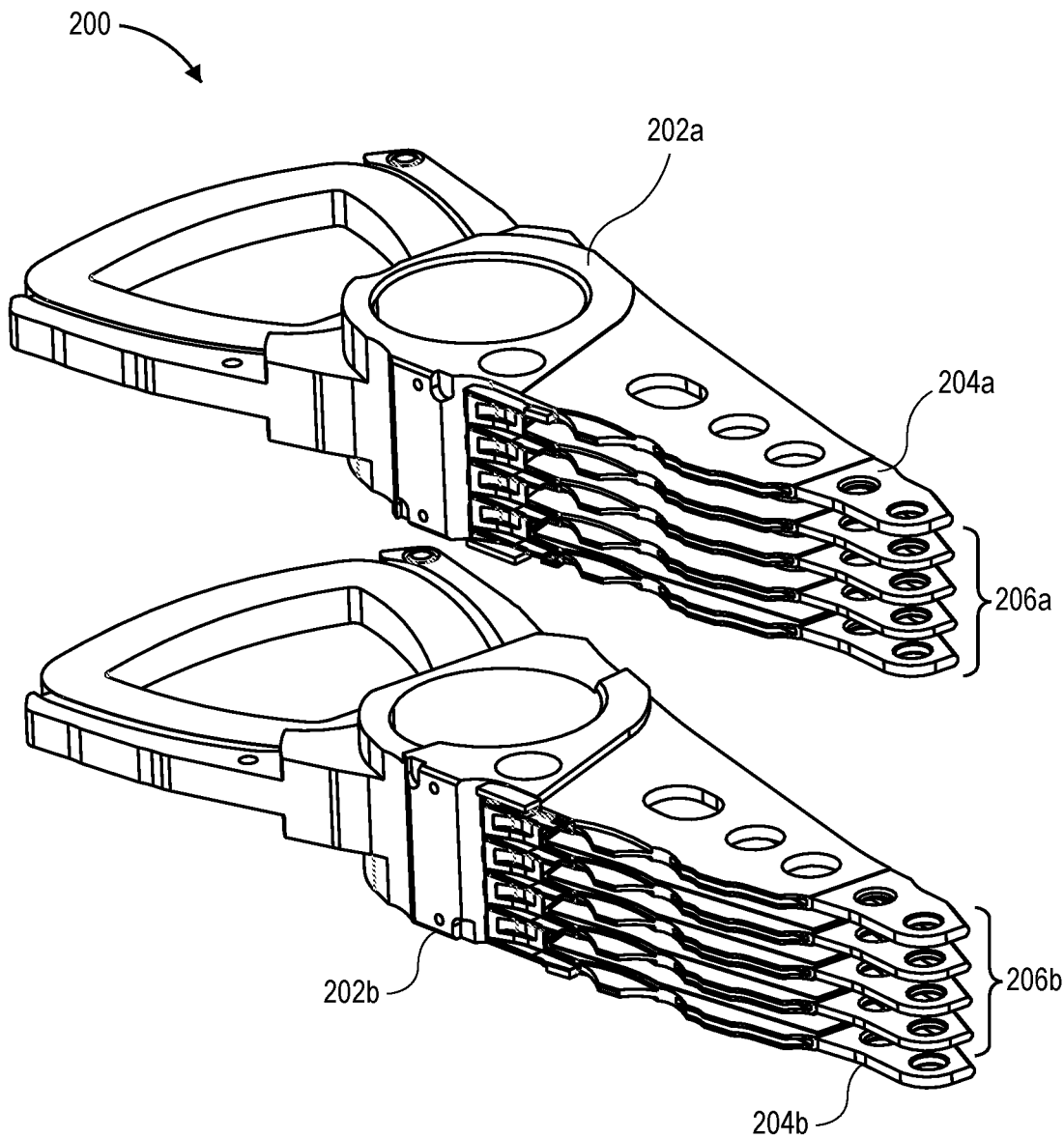
FIG. 2 is a perspective view illustrating a dual-actuator configuration, according to an embodiment.

FIG. 2 is a perspective view illustrating a dual-actuator configuration, according to an embodiment. FIG. 2 depicts in isolation (e.g., without a central pivot shaft(s) and other surrounding components depicted here, for purposes of simplicity and clarity) a dual-actuator configuration 200 having two actuator assemblies 202a, 202b (or simply "actuator 202a", "actuator 202b") in an HDD comprising ten recording disks (not shown here; see, e.g., recording medium 120 of FIG. 1). Here, each actuator 202a, 202b may be configured with a single end-arm with a single HGA, e.g., end-arm 204a and end-arm 204b, and one or more inner-arms with two HGAs, e.g., inner-arms 206a and inner-arms 206b. The uppermost end-arm 204a adjacent to an HDD cover would have a single HGA facing the upper or top surface of a corresponding disk, whereas the lowermost end-arm 204b adjacent to an HDD base would have a single HGA facing the lower or bottom surface of a corresponding disk.

However, a spacing advantage may be realized by having an unequal or asymmetric split in disk surfaces between the operational capacities of the top (upper) and bottom (lower) actuators, where the two actuators have an unequal number of read-write heads (e.g., 11 and 9, in a 10-disk system). Such an unequal configuration of heads between the upper and lower actuators is referred to herein as an "asymmetric dual-actuator" system and/or as an "asymmetric multiple (multi-) actuator" system.

Figure 3:
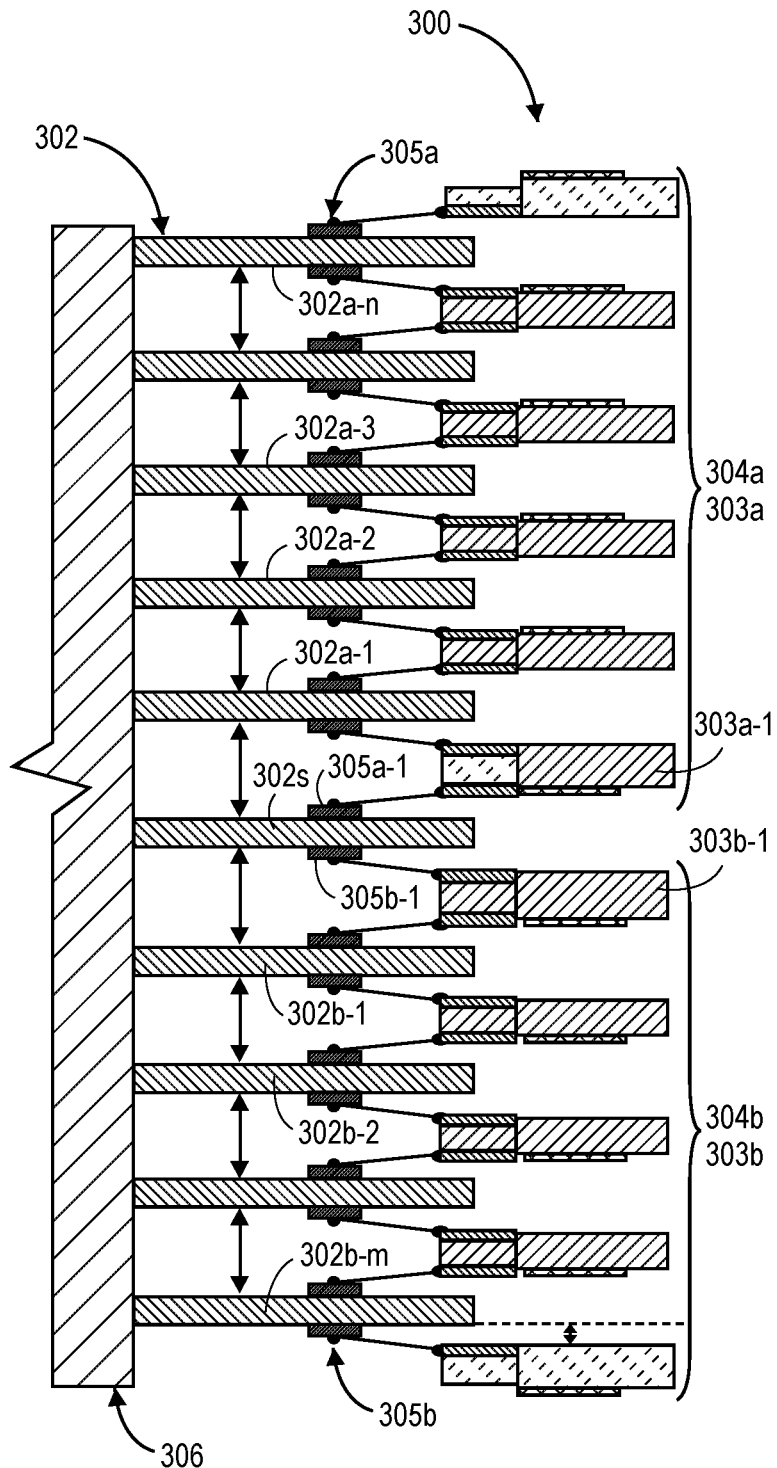
FIG. 3 is a side view diagram illustrating an asymmetric dual-actuator system, according to an embodiment.

FIG. 3 is a side view diagram illustrating an asymmetric dual-actuator system, according to an embodiment. According to an embodiment, a data storage system such as the 10-disk system depicted in FIG. 3 (further applicable to any other even-disk system), comprises a first head-stack assembly (HSA) 304a comprising a plurality of first arms 303a each coupled with a first head slider 305a comprising a read-write transducer (not visible here; see, e.g., read-write head 110a of FIG. 1), a second head-stack assembly (HSA) 304b comprising a plurality of second arms 303b each coupled with a second head slider 305b comprising a read-write transducer (not visible here; see, e.g., read-write head 110a of FIG. 1), and a plurality of disk media 302 (or "disk stack 302") rotatably mounted on a spindle 306. Note here the asymmetry of the actuator system 300, where the upper HSA 304a comprises a first number of arms 303a (e.g., six (6) as shown here) and heads (e.g., eleven (11) as shown here) and the lower HSA 304b comprises a different second number of arms 303b (e.g., five (5) as shown here) and heads (e.g., nine (9) as shown here), where the depiction of the upper HSA 304a as comprising the greater number of arms and heads is arbitrary here and for purposes of example only.

With this configuration the disk stack 302 includes (i) a shared disk medium 302s including a top surface positioned for operation with a first head slider 305a-1 of a first arm 303a-1 of the upper HSA 304a positioned above the shared disk medium 302s and a bottom surface positioned for operation with a second head slider 305b-1 of a second arm 303b-1 of the lower HSA 304b positioned below the shared disk medium 302s, (ii) one or more upper disk media 302a-1 through 302a-n above the shared disk medium 302s and operated upon by the upper HSA 304a, where n represents an arbitrary number of disks that may vary from implementation to implementation, and (iii) one or more lower disk media 302b-1 through 302b-m below the shared disk medium 302s and operated upon by the lower HSA 304b, where m represents an arbitrary number of disks that may vary from implementation to implementation. The use of the asymmetric actuator system 300 enables the employment of shared disk 302s and the implementation of various features advantageous to minimizing the total z-height needed for the disk stack 302 and the HSAs 304a, 304b.

However, despite spacing advantages of an asymmetric dual-actuator system, near-equal LUN (logical unit number) capacity is a strong customer requirement, as a host typically addresses a particular data storage device (DSD) in a data storage system in terms of a corresponding LUN and similarly typically addresses each actuator in a multi-actuator DSD in terms of a corresponding respective LUN. A "LUN" is technically an identifier of a logical unit of memory but is used here (and commonly and colloquially) to refer to the logical unit of memory itself. Hence, in view of the foregoing customer requirement, balancing the IOPS and/or throughput among LUNs executing seemingly identical workloads may be beneficial.

Example Configuration for Dual-Actuator Hard Disk Drive

Figure 4:
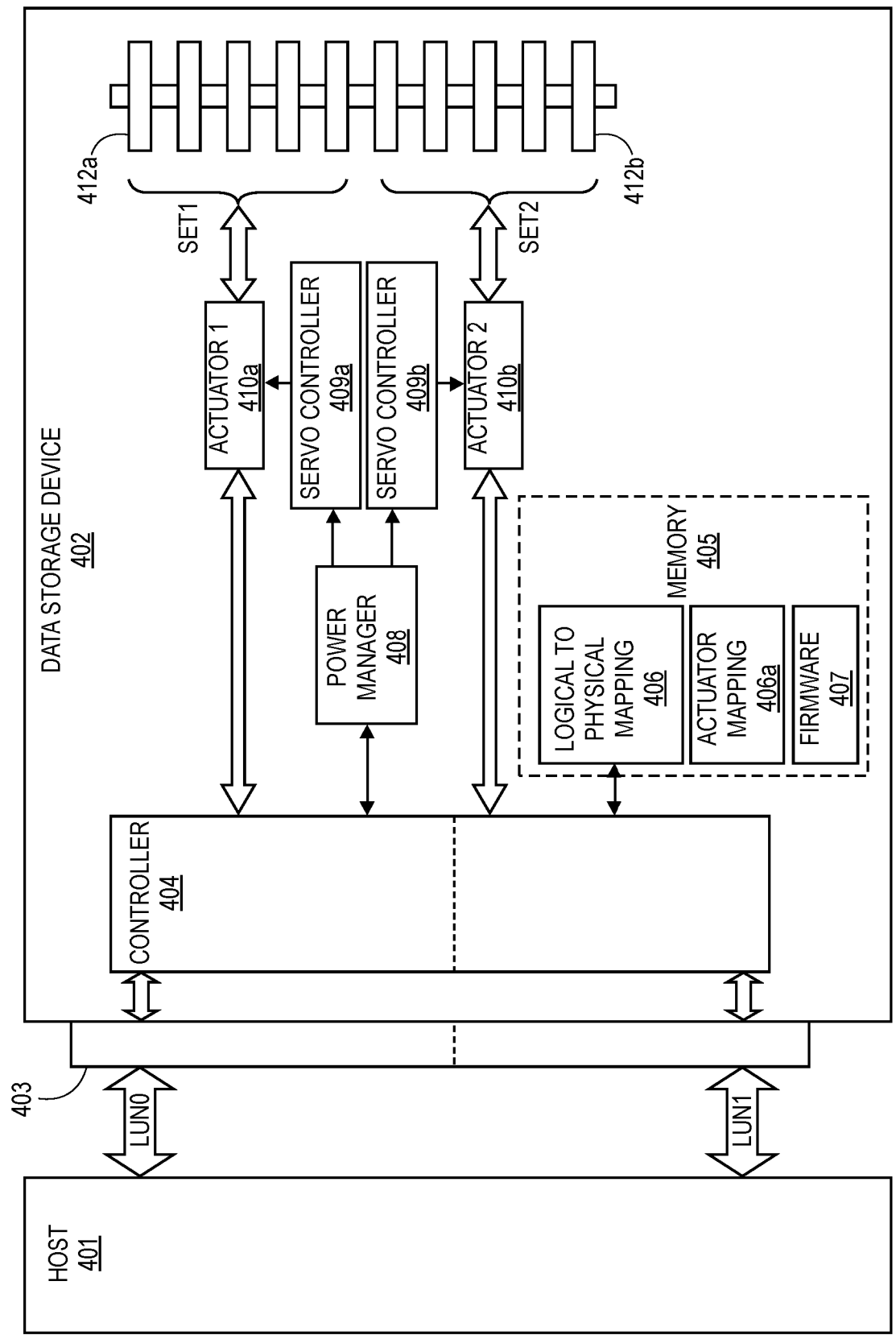
FIG. 4 is a block diagram illustrating an asymmetric dual-actuator hard disk drive, according to an embodiment.

FIG. 4 is a block diagram illustrating an asymmetric dual-actuator hard disk drive, according to an embodiment. FIG. 4 depicts an example Data Storage Device (DSD) 402 which communicates with a host 401, which may be embodied in a hardware machine on which executable code executes (for non-limiting examples, a computer or hardware server, and the like), or as software instructions executable by one or more processors (for non-limiting examples, a software server such as a database server, application server, media server, and the like). Host 401 generally represents a client of the DSD 402, and has the capability to make data read and write requests (input/output or "IO" operation requests) to the DSD 402. Host 401 and DSD 402 may form a system, such as a computer system (e.g., server, desktop, mobile/laptop, digital video recorder, and the like) or other electronic device. The components of FIG. 4 may or may not be physically co-located and therefore host 401 may be located remotely from DSD 402. Those of ordinary skill in the art will appreciate that embodiments can include more or fewer than those elements shown in FIG. 4 and that the disclosed processes can be implemented in other environments having different configurations, such as a different number of actuators for a non-limiting example.

DSD 401 includes non-volatile memory (NVM) in the form of rotating magnetic media, depicted here in the form of one or more disk stacks, i.e., disks 412a and disks 412b. Here, disks 412a (disk "set 1" of FIG. 4) are associated with and correspond to a first actuator 410a ("actuator 1" of FIG. 4) and disks 412b (disk "set 2" of FIG. 4) are associated with and correspond to a second actuator 410b ("actuator 2" of FIG. 4). Each actuator 410a, 410b assembly comprises one or more read-write transducers or heads (not visible here; see, e.g., read-write head 110a of FIG. 1) configured to provide concurrent access to each of the magnetic disks and disk sets, i.e., disks 412a, 412b. As such, the read-write heads coupled to the first actuator 410a access different surfaces of the recording media than the read-write heads coupled to the second actuator 410b, where each disk surface of disks 412a, 412b includes a number of radially spaced, concentric tracks for storing data. The number of magnetic recording disks operated upon by each of the actuators 410a, 410b (depicted here as ten (10) disks total) may vary from implementation to implementation. According to an embodiment, actuators 410a, 410b are configured to rotate independently of each other about one or more actuator pivots (not visible here, see, e.g., pivot shaft 148 of FIG. 1). In this regard, actuators 410a, 40b are in a split coaxial configuration that allows the heads on each actuator 410a, 40b to access areas of disks 412a, 412b that are not radially aligned with each other, where such rotational independence provides for an improvement in the performance in terms of IOPS of DSD 402 over DSDs with only a single actuator. Stated otherwise, the independent movement of actuators 410a, 410b can facilitate simultaneous reading and/or writing in different radial locations to perform more commands in a given amount of time.

As discussed, host 401 typically addresses each actuator 410a, 410b in a multi-actuator DSD such as depicted in FIG. 4 in terms of a corresponding LUN. For example, host 401 identifies with and is shown interacting with the first actuator 410a in terms of or in the context of a first LUN (e.g., depicted as LUN0) and with the second actuator 410b in terms of or in the context of a second LUN (e.g., depicted as LUN1). As such, host 401 would direct operational commands to the first actuator 410a by identifying and addressing such operations to LUN0 and would direct operational commands to the second actuator 410b by identifying and addressing such operations to LUN1. Likewise, host 401 would expect a response from the first actuator 410a from, i.e., in the context of or as corresponding to, LUN0 and would expect a response from the second actuator 410b from, i.e., in the context of or as corresponding to, LUN1.

Host 401 interacts with DSD 402 via an interface 403 (e.g., an IO interface) for transferring data to and from the DSD 402, such as via a bus or network such as Ethernet or WiFi or a bus standard such as Serial Advanced Technology Attachment (SATA), PCI express (PCIe), Small Computer System Interface (SCSI), or Serial Attached SCSI (SAS), for non-limiting examples. In operation, interface 403 receives host read and write commands from host 401 for reading data from and writing data to disk surfaces of disks 412a, 412b. Those of ordinary skill in the art will appreciate that an interface for a multi-actuator DSD, such as interface 403 of DSD 401, may be implemented as separate interfaces for each of the multiple actuators 410a, 410b, having respective interface ports, electronic circuitry, and the like.

DSD 402 includes an electronic controller 404, which includes circuitry such as one or more processors for executing instructions, and may be implemented as a System On a Chip (SoC) electronic circuitry, which may include a memory 405, a microcontroller, a Digital Signal Processor (DSP), an Application-Specific Integrated Circuit (ASIC), a Field Programmable Gate Array (FPGA), hard-wired logic, analog circuitry and/or a combination thereof, for non-limiting examples. Those of ordinary skill in the art will appreciate that interface 403 can be included as part of controller 404. Firmware 407, which may be stored in memory 405, includes computer-executable instructions for execution by controller 404 in operating DSD 402. Executable logic stored as one or more sequences of instructions, such as in the form of firmware 407, is configured to dictate how data transfer operations (e.g., read and write commands/requests, data access/transfer operations, responses, and the like) are scheduled to be transferred through the interface 403 and among the multiple actuators 410a, 410b. Controller 404 may include a read/write channel (not shown) configured to encode data corresponding to write commands and decode data corresponding to read commands. Here also, those of ordinary skill in the art will appreciate that a controller for a multi-actuator DSD, such as controller 404 of DSD 402 and/or the read/write channel particularly, may be implemented as separate electronic circuitry and/or logic instructions (i.e., different "channels", per se) for each of the multiple actuators 410a, 410b.

A controller such as controller 404 typically includes, or operates in conjunction with, one or more servo controllers 409a, 409b that transmit commands to each actuator 410a, 410b for accessing portions of disks 412a, 412b. Servo controllers 409a, 409b send VCM (voice coil motor) commands to respective VCMs (not visible here, see, e.g., VCM coil 140 of FIG. 1) to control movement of actuators 410a, 410b in positioning read-write heads in relation to the surfaces of disks 412a, 412b. More particularly, each surface of disks 412a, 412b can include servo wedges that can provide location information (e.g., a servo burst) that can be read from the disk surface by a read-write head to determine a position of the head. According to an embodiment, each of the one or more servo controllers 409a, 409b or the controller 404 more generally may cooperate with functionality of a power manager 408, which functions to control and manage the power transmitted to each of the actuators 410a, 410b. Those of ordinary skill in the art will appreciate that power manager 408 can be included as part of controller 404, such as embodied in firmware 407 for example. One aspect of DSD 402 operational capability that power manager 408 enables is regarding a tradeoff between power and performance of each actuator 410a, 410b. For example, power manager 408 can be configured to decrease the power to a particular actuator 410a, 410b which would reduce the performance (e.g., IOPS) of the particular actuator commensurately and/or increase the power to a particular actuator 410a, 410b which may increase the performance of the particular actuator commensurately, the significance of which is discussed in more detail elsewhere herein.

For data to be written on a disk surface, the read/write channel of controller 404 may encode buffered data into a write signal, which is provided to a head for magnetically writing data on a disk surface that has been assigned logical addresses for the data in the write command. In addition, controller 404 via servo controller 409a, 409b can provide VCM commands to VCMs of actuators 410a, 410b to position the head over a particular track for writing the data. Furthermore, in response to a read command for data stored on a disk surface of disks 412a, 412b, controller 404 via servo controller 409a, 409b positions a head over a particular track on a disk surface that has been assigned logical addresses for the data in the read command. Controller 404 controls the head to magnetically read data stored in the track, and to send the read data as a read signal to a read/write channel of controller 404. The read/write channel can then decode and buffer the data into memory 405 or another memory for transmission to host 401 via interface 403

The memory 405 of DSD 402 is further configured to store the firmware 407, a logical to physical mapping 406, and an actuator mapping 406a. In some implementations, memory 405 may be volatile memory such as Dynamic Random Access Memory (DRAM), with temporary copies of one or more of the firmware 407, the logical to physical mapping 406 and the actuator mapping 406a, which may be stored more permanently in a non-volatile memory (NVM), such as on disks 412a, 412b or in another NVM of DSD 402. In other implementations, memory 405 may be an NVM, such as a NAND flash memory, a Magnetoresistive Random Access Memory (MRAM) or other type of non-volatile solid-state memory.

Logical to physical mapping 406 (generally, a data structure or collection of data values and the relationships among them) associates logical addresses of data with physical locations for storing the data on the disk surfaces of disks 412a, 412b. In some implementations, logical to physical mapping 406 may include a translation table that maps Logical Block Addresses (LBAs) of data to Physical Block Addresses (PBAs) indicating a location on a disk surface, such as a particular sector or range of sectors in a particular track on the disk surface or particular block(s) (e.g., of one or more sectors). The logical addresses in logical to physical mapping 406 can be expressed as address ranges, for example, and where a group of which is associated with a particular logical unit or LUN (see, e.g., LUN0 and LUN1 of FIG. 4). Additionally, logical to physical mapping 406 may include or may be associated with actuator mapping 406a (e.g., a data structure) that maps physical addresses on disks 412a, 412b to the actuator 410a, 410b that accesses the physical addresses, where the physical addresses may be represented in the actuator mapping 406a as ranges of physical addresses accessed by each actuator 410a, 410b. In some implementations, the actuator mapping 406a may be arranged based on head mapping information indicating which head accesses different physical addresses.

Equalizing LUN Capacity in Asymmetric Dual-Actuator Hard Disk Drive

In view of the spacing advantages of an asymmetric dual-actuator system such as that of actuator system 300 of FIG. 3, and of the desire for near-equal LUN (logical unit number) capacity and performance, recall that balancing the IOPS and/or throughput among LUNs executing seemingly identical workloads may be beneficial. Hence, according to an embodiment, data operation/transfer commands (i.e., read and write requests) performed by one actuator are effectively "credited" to another actuator in a multi-actuator system. Consequently, LUN capacity is effectively equalized or balanced among the multiple LUNs corresponding to such an asymmetric multi-actuator system. Herein, such commands that are performed by one actuator and credited to another actuator and/or corresponding LUN are referred to as "parasitic" (or "parasitic commands", or reference "parasitic blocks" corresponding to such commands).

Processing, functions, procedures, actions, method steps, and the like, that are described herein may include enactment by execution of one or more sequences of one or more instructions stored in one or more memory units and which, when executed by one or more processors, cause such performance. For example, controllers referenced herein (e.g., controller 404 of FIG. 4) and embodied in any form of and/or combination of software, hardware, and firmware, such as an application-specific integrated circuit (ASIC) comprising at least one memory unit for storing such instructions and at least one processor for executing such instructions, may be configured and implemented for such execution of instructions.

Figure 5:
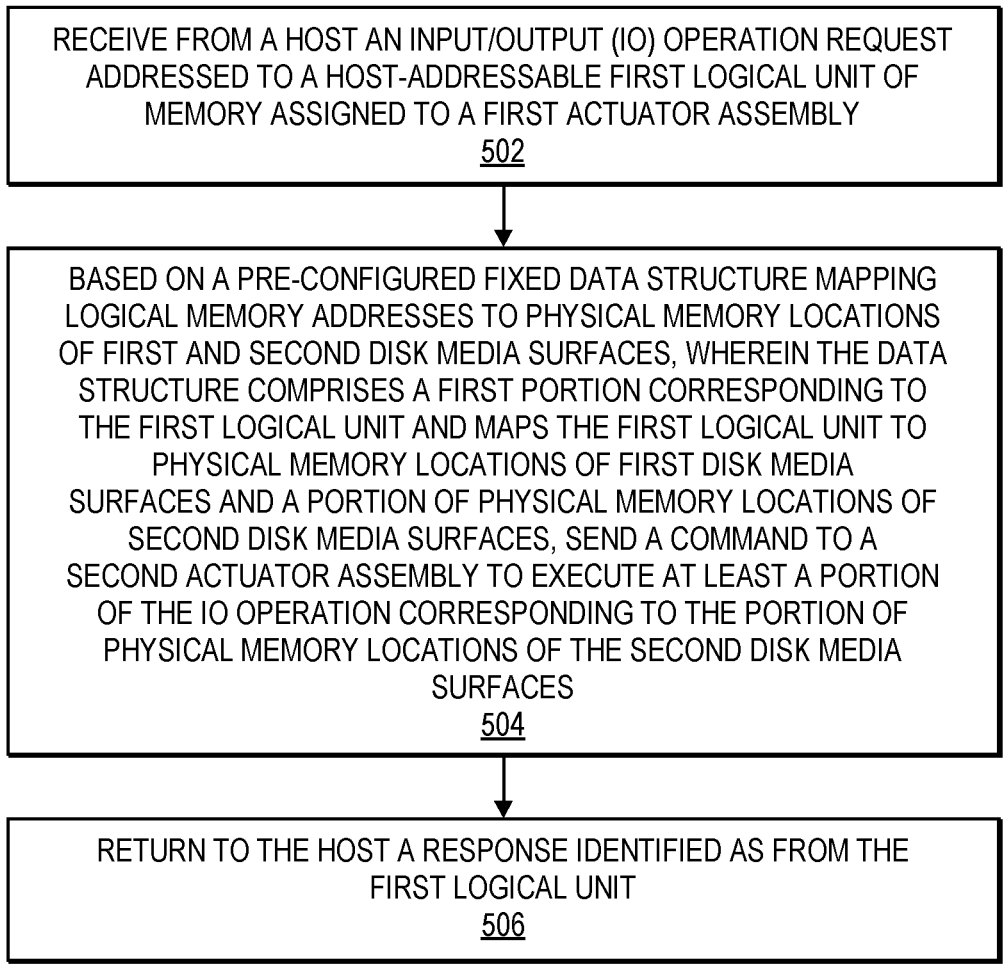
FIG. 5 is a flow diagram illustrating a method of controlling a hard disk drive asymmetric multi-actuator system, according to an embodiment.

FIG. 5 is a flow diagram illustrating a method of controlling a hard disk drive asymmetric multi-actuator system, according to an embodiment. Here, hard disk drive comprises an asymmetric multi-actuator system (see, e.g., FIGS. 3-4) comprising a first actuator assembly (e.g., actuator 410a of FIG. 4, also referred to as "actuator 1") configured to operate on a corresponding first number of first disk media surfaces (e.g., disks 412a of FIG. 4, also referred to as disk "set 1") and a second actuator assembly (e.g., actuator 410b of FIG. 4, also referred to as "actuator 2") configured to operate on a corresponding greater second number of second disk media surfaces (e.g., disks 412b of FIG. 4, also referred to as disk "set 2").

At block 502, an input/output (IO) operation request addressed to a host-addressable first logical unit of memory assigned to a first actuator assembly is received from a host. For example, data storage device (DSD) 402 (FIG. 4) receives from host 401 (FIG. 4), via interface 403 (FIG. 4), a data read or write request, whereby such request is routed through the interface 403 to the controller 404 (FIG. 4) of DSD 402.

At block 504, based on a pre-configured fixed data structure mapping logical memory addresses to physical memory locations of the first and second disk media surfaces, wherein the data structure includes a first portion corresponding to the first logical unit and maps the first logical unit to physical memory locations of the first disk media surfaces and a portion of physical memory locations of the second disk media surfaces, sending a command to the second actuator assembly to execute at least a portion of the IO operation corresponding to the portion of physical memory locations of the second disk media surfaces. For example, based on the logical to physical mapping 406 (FIG. 4), a command addressed to LUN0 and by extension for actuator 410a (e.g., the actuator operating upon fewer disk surfaces, such as the lower HSA 304b of FIG. 3) is routed to actuator 410b (e.g., the actuator operating upon greater number of disk surfaces, such as the upper HSA 304a of FIG. 3) to execute at least the portion of the IO operation that corresponds to physical memory location(s) of the second disk media surfaces of disks 412b that are mapped to logical memory associated with LUN0. This is because the logical to physical mapping 406 is pre-configured to map logical memory addresses to physical memory locations of the media surfaces of disks 412a, 412b, including a first portion corresponding to the first logical unit (e.g., LUN0) which maps LUN0 to physical memory locations of the first disk media surfaces of disks 412a and a portion of physical memory locations of the second disk media surfaces of disks 412b, the latter of which is also referred to herein as parasitic blocks of memory. It is noteworthy that such mapping is a pre-configured and fixed data structure that is not being dynamically modified during operation and/or in response to current operational workload thresholds, metrics, access frequencies, type of operation, buffer status, and the like.

At block 506, a response identified as from the first logical unit is returned to the host. For example, the response to the host request received at block 502, which was addressed to LUN0 and by extension for actuator 410a, is returned to host 401 identified or addressed as transferred from LUN0 even though at least a portion of the actual data read or data write operation was performed by the second actuator 410b, which is host-configured to be associated with and/or host-addressable as LUN1.

Allocation of Parasitic Memory Blocks

Figure 6A:
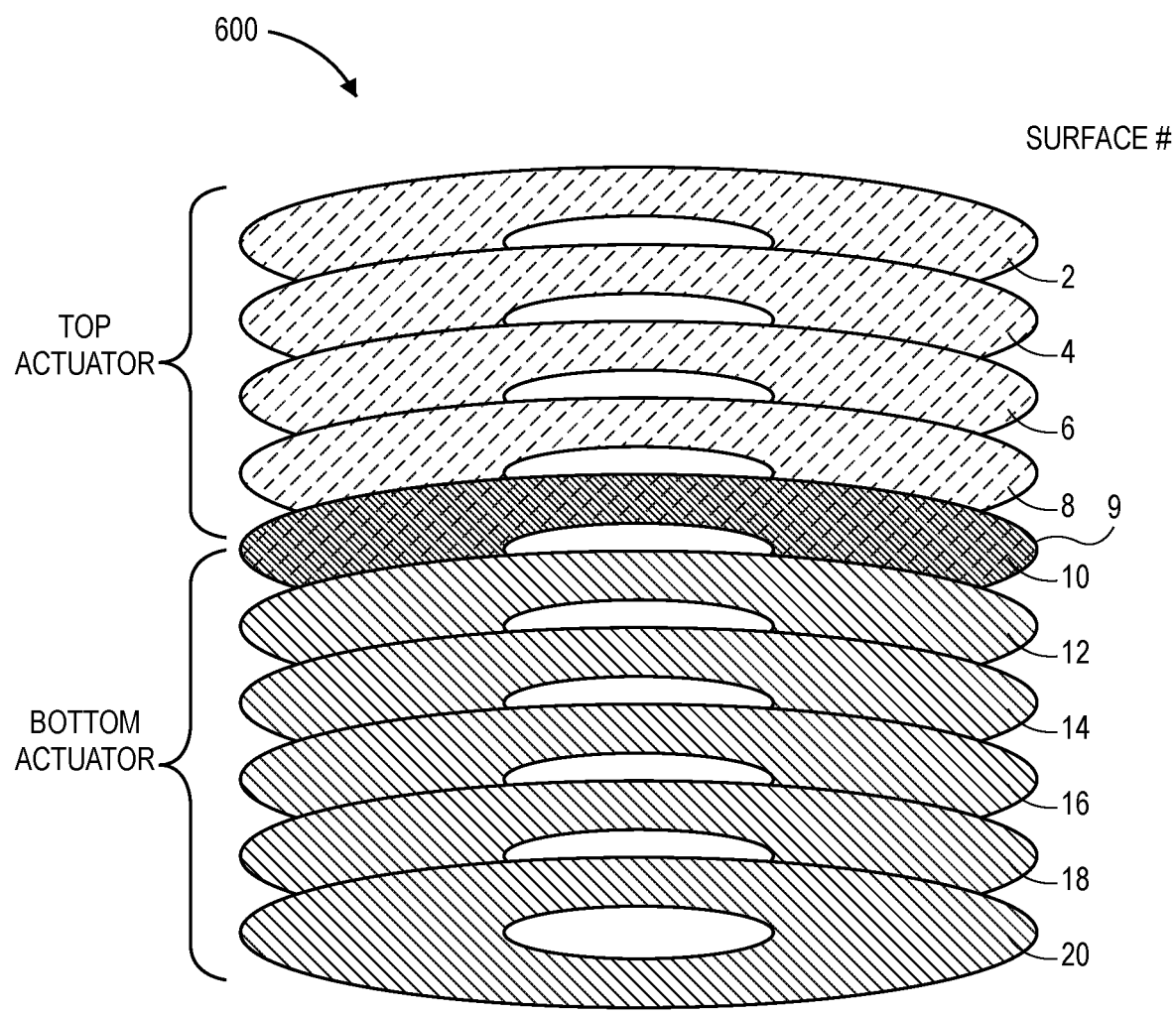
FIG. 6A is a perspective view illustrating an asymmetric dual-actuator disk stack having a parasitic surface, according to an embodiment.
Figure 6B:
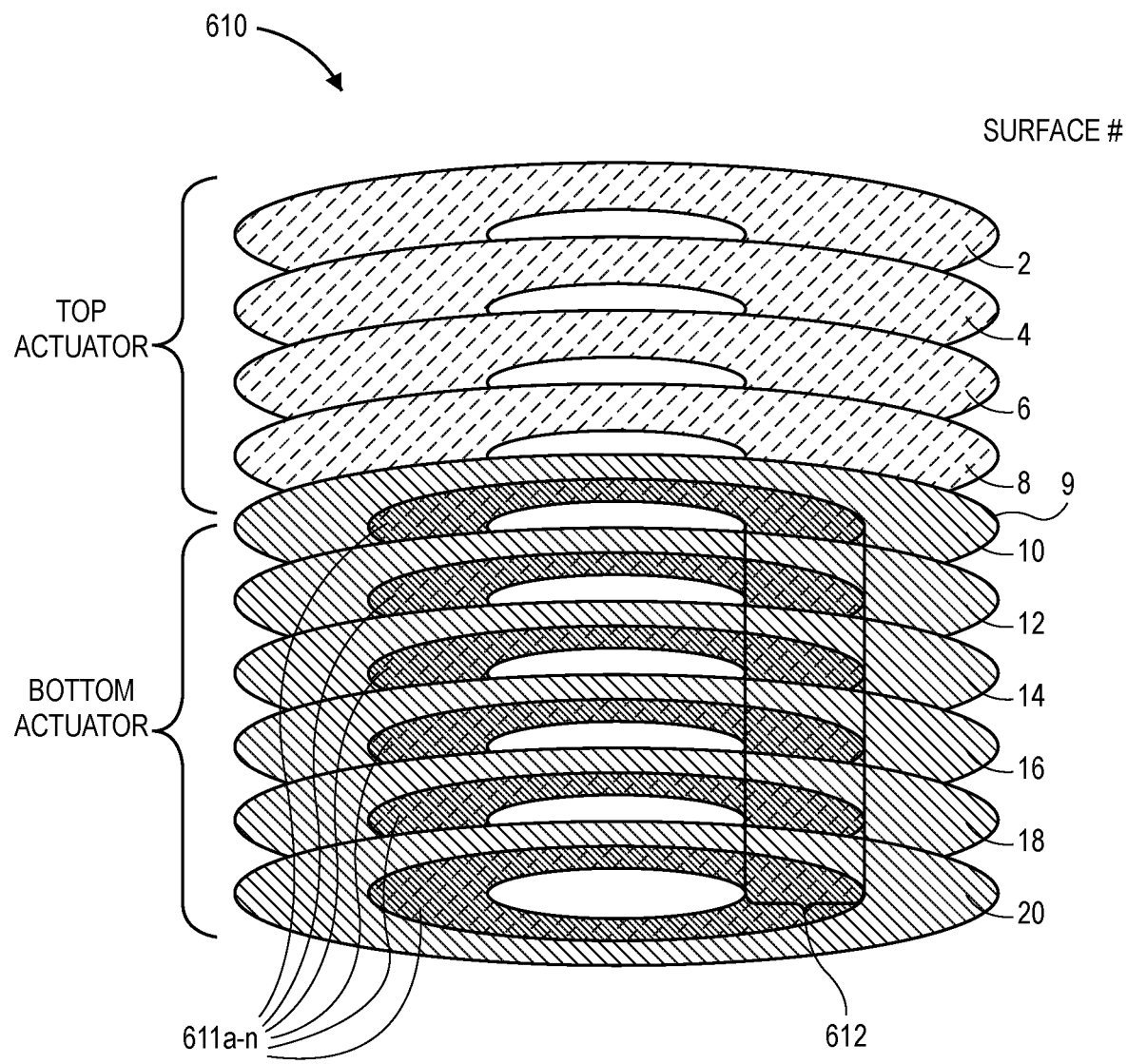
FIG. 6B is a perspective view illustrating an asymmetric dual-actuator disk stack having a parasitic inner-diameter (ID), according to an embodiment.
Figure 6C:
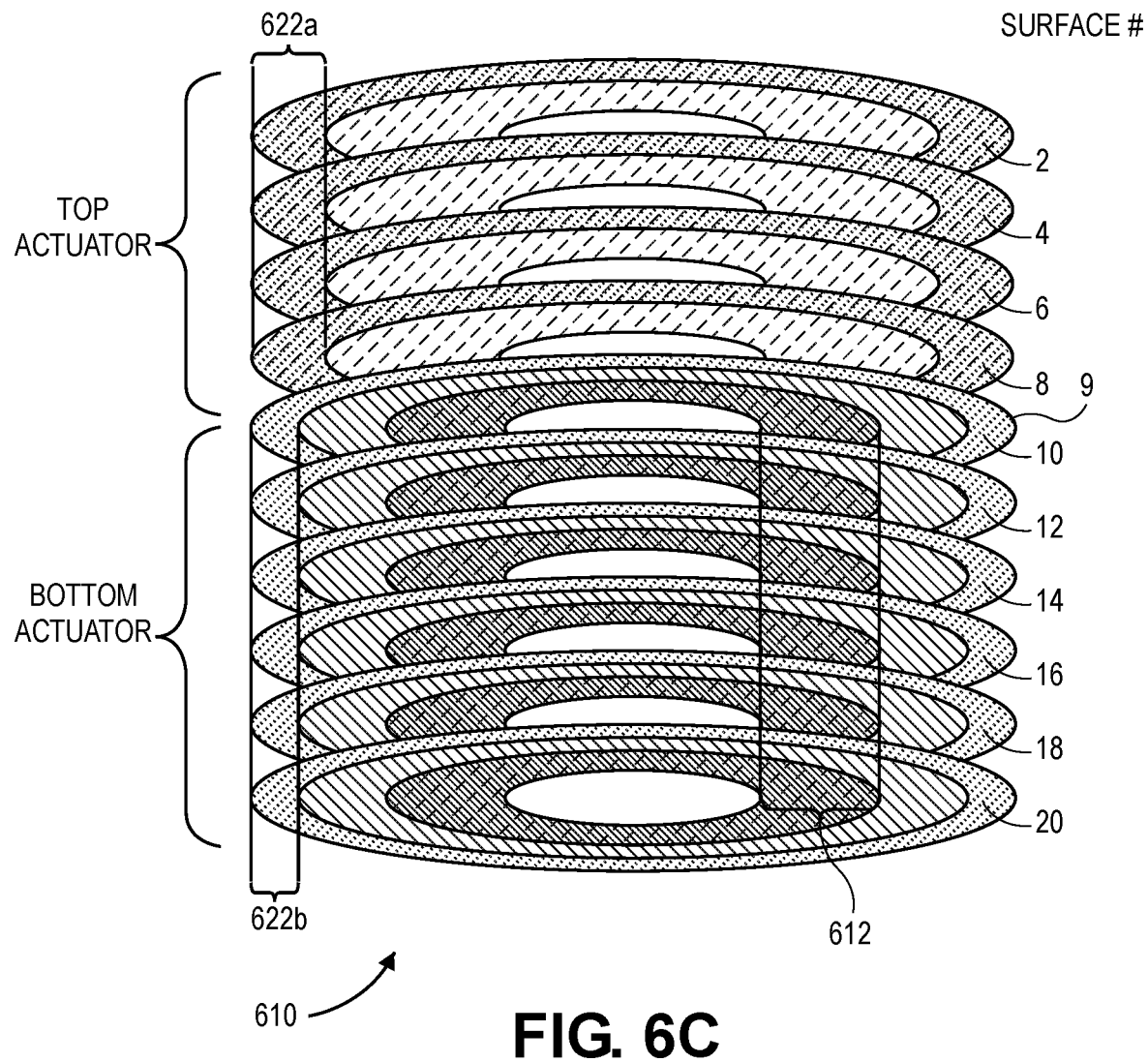
FIG. 6C is a perspective view illustrating an asymmetric dual-actuator disk stack having a parasitic inner-diameter (ID) and a limited partition, according to an embodiment.

According to embodiments, there are a number of ways in which parasitic commands/parasitic memory blocks may be allocated or implemented, and FIGS. 6A-6C illustrate embodiments of the allocation of parasitic memory blocks on which parasitic commands are performed. Note that the asymmetric dual-actuator disk stacks illustrated in FIGS. 6A-6C are illustrative of scenarios in which the lower actuator operates upon a greater number of disk surfaces and the upper actuator operates upon a fewer number of disk surfaces, which is in contrast to or the reverse of the illustration of FIG. 3 in which the lower actuator operates upon a fewer number of disk surfaces and the upper actuator operates upon a greater number of disk surfaces.

FIG. 6A is a perspective view illustrating an asymmetric dual-actuator disk stack having a parasitic surface, according to an embodiment. This example of an asymmetric dual-actuator disk stack is based on a 10-disk stack for purposes of a non-limiting example and is not so limited in practical implementation. Allocation configuration 600($i$) assigns the top-most nine (9) surfaces (e.g., surfaces 1-9), which are operated upon by the top actuator, to LUN0, (ii) assigns the bottom-most ten (10) surfaces (e.g., surfaces 11-20), which are operated upon by the bottom actuator, to LUN1, and (iii) assigns the bottom surface of the shared disk (e.g., surface 10), which is operated upon by the bottom actuator, to LUN0. Thus, commands performed on the entire host-addressable (i.e., host data storage portion only, exclusive of disk portions reserved for HDD control/management purposes) tenth ($10^{th}$) surface, i.e., the parasitic surface on which parasitic commands are performed, are executed by the bottom actuator (e.g., actuator 410b of FIG. 4) but credit is given to the top LUN (e.g., LUN0 of FIG. 4). That is, in the logical to physical mapping (e.g., logical to physical mapping 406 of FIG. 4) the physical memory locations corresponding to the $10^{th}$ surface are mapped to the logical memory space allocated or assigned to the LUN (e.g., LUN0 of FIG. 4) that corresponds to the upper actuator (e.g., actuator 410a of FIG. 4), even though data commands directed to those logical memory addresses are performed by the lower actuator (e.g., actuator 410b of FIG. 4).

FIG. 6B is a perspective view illustrating an asymmetric dual-actuator disk stack having a parasitic inner-diameter (ID), according to an embodiment. This example of an asymmetric dual-actuator disk stack is based on a 10-disk stack for purposes of a non-limiting example and is not so limited in practical implementation. Allocation configuration 610($i$) assigns the top-most nine (9) surfaces (e.g., surfaces 1-9), which are operated upon by the top actuator, to LUN0, (ii) assigns the bottom-most eleven (11) surfaces (e.g., surfaces 10-20), which are operated upon by the bottom actuator, to LUN1, (iii) exclusive of a portion of one or more of the bottom-most eleven (11) surfaces, which are operated upon by the bottom actuator, which are assigned to LUN0. Thus, commands performed on a portion of one or more of the tenth-twentieth ($10^{th}$-$20^{th}$) surfaces, i.e., the parasitic portion(s) on which parasitic commands are performed, are executed by the bottom actuator (e.g., actuator 410b of FIG. 4) but credit is given to the top LUN (e.g., LUN0 of FIG. 4).

According to an embodiment, the portion of the one or more bottom-most eleven (11) surfaces (e.g., surfaces 10-20) that are operated upon by the bottom actuator but are assigned to LUN0 consists of a respective band of host-addressable memory addresses on one or more of the surfaces 10-20. For example and according to an embodiment, the portion of the one or more surfaces 10-20 that are operated upon by the bottom actuator but are assigned to LUN0 consists of a respective inner-diameter (ID) band of host-addressable memory addresses on one or more of the surfaces 10-20, as depicted in allocation configuration 610 of FIG. 6B. For another example and according to an embodiment, the portion of the one or more surfaces 10-20 that are operated upon by the bottom actuator but are assigned to LUN0 consists of a respective inner-diameter (ID) band 611a-611n (where n represents an arbitrary number of disk surfaces that may vary from implementation to implementation) of host-addressable memory addresses on each of the surfaces 10-20, i.e., a parasitic logical cylinder(s) 612 (cylinder: the set of tracks described by all the heads on separate disks at a single seek position, each cylinder being equidistant from the center of the disk), as depicted in allocation configuration 610 of FIG. 6B. Thus, in the logical to physical mapping (e.g., logical to physical mapping 406 of FIG. 4) the physical memory locations corresponding to an inner-diameter band of the $10^{th}$-$20^{th}$ surfaces are mapped to the logical memory space allocated or assigned to the LUN (e.g., LUN0 of FIG. 4) that corresponds to the upper actuator (e.g., actuator 410a of FIG. 4), even though data commands directed to those logical memory addresses are performed by the lower actuator (e.g., actuator 410b of FIG. 4). Here, the inner-diameter band of physical memory addresses are selected to be the parasitic portions of memory blocks on which parasitic commands are performed because memory is typically addressed and used starting from the outer diameter (OD) of each recording medium (e.g., hard disk) and moving inward toward the inner diameter of the medium and, therefore, the parasitic portion of memory is largely avoided or not reached until the device capacity is relatively full.

The performance of a multi-actuator hard disk drive (HDD) may be measured in terms of logical LUN IOPS and actuator IOPS. In view of the described techniques for controlling a HDD asymmetric multi-actuator system to equalize the logical unit capacity, it may be desirous to go further and also match the performance (e.g., in terms of IOPS) among the logical LUNs. According to an embodiment, one approach to matching the performance between the LUNs corresponding to an asymmetric dual-actuator system is to reduce the IOPS corresponding to the smaller actuator, i.e., the actuator having fewer heads (e.g., the top actuator of FIGS. 6A-6C, actuator 410a of FIG. 4, lower HSA 304b of FIG. 3).

As discussed, one operational capability of the power manager 408 (FIG. 4) of DSD 402 (FIG. 4) is the ability to manage the tradeoff between power and performance of each actuator 410a, 410b (FIG. 4). There are known tunable techniques for managing such tradeoff, such as algorithms to improve tail latency, modeling and reacting to the energy required of a command seek, and the like. Hence, according to an embodiment, such as implemented as an optional extension to the method of FIG. 5, the power to one actuator is reduced to reduce the IOPS of that actuator. For example, the power to the actuator 410a is reduced at a cost to the performance of actuator 410a, i.e., to reduce the IOPS of that actuator 410a having fewer heads to more closely match the IOPS of the other larger actuator 410b having more heads, which is having to work harder when the parasitic memory is reached and therefore may appear to be underperforming from a LUN standpoint. Here, the harder-working actuator 410b is effectively compensated, via more power, for the performance asymmetry or degradation it experiences from executing parasitic commands on the parasitic memory for which actuator 410a receives LUN and LUN IOPS credit.

Limited Partition Configuration for Host Workload

It is not uncommon for a particular host workload, or otherwise, to drive the need for disk partitioning. Disk partitioning involves the creation, designation, definition of one or more regions of storage memory (i.e., "partitions") so that each region can be managed separately and utilized somewhat independently, where each partition then appears to the operating system as a distinct logical disk that uses part of the actual disk. In such a scenario, it may be desirable to avoid the parasitic portion(s) of memory (see, e.g., parasitic cylinder(s) 612 of FIG. 6B) on which parasitic commands are performed and the associated complexity altogether.

FIG. 6C is a perspective view illustrating an asymmetric dual-actuator disk stack having a parasitic inner-diameter (ID) and a limited partition, according to an embodiment. Here again this example of an asymmetric dual-actuator disk stack is based on a 10-disk stack for purposes of a non-limiting example and is not so limited in practical implementation. While the allocation configuration depicted in FIG. 6C is the same as or similar to the allocation configuration 610 of FIG. 6B, here a 10% limited partition is illustrated for a non-limiting example. With the example 10% limited partition as configured and illustrated in FIG. 6C, whereby each LUN is only accessing the lowest 10% of the logical memory address space (e.g., the lowest-numbered LBAs), a corresponding limited partition workload is covered by $1/9^{th}$ of the disks for the top nine (9) surfaces (e.g., surfaces 1-9) and $1/11^{th}$ of the disks for the bottom eleven (11) surfaces (e.g., surfaces 10-20), at each respective outer diameter band 622a, 622b of surfaces 1-9 and 10-20, respectively. As such, the 9-head top actuator is limited to $1/9^{th}$ (OD) of the disks (where this actuator has a larger stroke distance, i.e., larger number of tracks, but is mechanically faster) and the 11-head bottom actuator is limited to $1/11^{th}$ (OD) of the disks (where this actuator has a smaller stroke distance, i.e., fewer number of tracks, but is mechanically slower). Thus, the parasitic cylinder(s) 612 (e.g., parasitic LBAs) is avoided, or effectively operationally unnecessary, in the context of such a limited partition workload. Similarly, with respect to an example 20% limited partition request, a corresponding limited partition workload would be covered by an allocated $2/9^{th}$ of the disks for the top nine (9) surfaces (e.g., surfaces 1-9) and an allocated $2/11^{th}$ of the disks for the bottom eleven (11) surfaces (e.g., surfaces 10-20), at each respective outer diameter band 622a, 622b of surfaces 1-9 and 10-20, respectively, by widening each outer diameter band 622a, 622b, and so on. As such, the parasitic cylinder(s) 612 would be avoided in the context of a limited partition workload until a given partition is large enough to then include at least a portion of the parasitic cylinder(s) 612 (say, a 70% partition, for an arbitrary example).

Hence, according to an embodiment, such as an optional extension to the method of FIG. 5, in response to a disk configuration request for a limited partition of memory for a host workload, (i) a respective outer diameter band of host-addressable memory addresses on the first disk media surfaces is allocated or assigned to the physical memory locations of the first disk media surfaces of the first logical unit, and (ii) a respective outer diameter band of host-addressable memory addresses on the second disk media surfaces is allocated or assigned to the physical memory locations of the second disk media surfaces of the second logical unit. For example, in response to a host 401 (FIG. 4) disk configuration partition request, the outer diameter band 622a of memory on disk media surfaces 1-9 is assigned to the physical memory locations of the first disk media surfaces (e.g., disks 412a of FIG. 4) of the first logical unit (e.g., LUN0 of FIG. 4), and the outer diameter band 622b of memory on disk media surfaces 10-20 is assigned to the physical memory locations of the second disk media surfaces (e.g., disks 412b of FIG. 4) of the second logical unit (e.g., LUN1 of FIG. 4), thereby avoiding the parasitic cylinder(s) 612.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a first actuator assembly associated with a host-addressable first logical unit and configured to operate on a corresponding first set of disk media surfaces;
a second actuator assembly associated with a host-addressable second logical unit and configured to operate on a corresponding second set of disk media surfaces greater than the first set; and
an electronic controller communicatively coupled with the first actuator assembly and the second actuator assembly, the controller configured to access:

a mapping of logical memory addresses to physical memory locations, the mapping comprising:
  a first portion corresponding to the first logical unit associated with the first actuator assembly, wherein the first portion maps the first logical unit to the physical memory locations of the first set of disk media surfaces and a parasitic portion of the second set of disk media surfaces, such that operations by the second actuator assembly on the parasitic portion of the second set of disk media surfaces are attributed to the first logical unit associated with the first actuator assembly, and
  a second portion corresponding to the second logical unit, wherein the second portion maps the second logical unit to the physical memory locations of the second set of disk media surfaces exclusive of the parasitic portion of the second set of disk media surfaces, such that operations by the second actuator assembly on the parasitic portion of the second set of disk media surfaces are attributed to the first logical unit associated with the first actuator assembly.

2. The data storage device of claim 1, wherein the parasitic portion of physical memory locations of the second set of disk media surfaces corresponds to an entire surface available for host data storage of at least one disk medium of the second set of disk media.

3. The data storage device of claim 1, wherein the parasitic portion of physical memory locations of the second set of disk media surfaces corresponds to a respective band of host-addressable memory addresses on one or more of the second set of disk media surfaces.

4. The data storage device of claim 3, wherein the parasitic portion of physical memory locations of the second set of disk media surfaces corresponds to a respective inner-diameter band of host-addressable memory addresses on one or more of the second set of disk media surfaces.

5. The data storage device of claim 3, wherein the parasitic portion of physical memory locations of the second set of disk media surfaces corresponds to a respective inner-diameter band of host-addressable memory addresses on each of the second set of disk media surfaces.

6. The data storage device of claim 1, wherein the parasitic portion of physical memory locations of the second set of disk media surfaces corresponds to a respective band of host-addressable memory addresses on each of the second set of disk media surfaces.

7. The data storage device of claim 1, the controller further configured to:
  receive from a host an input/output (TO) operation request addressed to the first logical unit;
  based on the mapping, send a command to the second actuator assembly to execute at least a portion of the IO operation involving the parasitic portion of the second set of disk media surfaces; and
  return to the host a response identified as from the first logical unit.

8. The data storage device of claim 7, wherein the controller is further configured to:
  reduce power to the first actuator assembly to reduce input/output operations per second (IOPS) of the first actuator assembly.

9. A method of controlling a hard disk drive asymmetric multi-actuator system, wherein a first actuator assembly is configured to operate on a corresponding first number of first disk media surfaces and a second actuator assembly is configured to operate on a corresponding higher second number of second disk media surfaces, the method comprising:
  receiving from a host an input/output (TO) operation request addressed to a host-addressable first logical unit of memory assigned to the first actuator assembly;
  based on a pre-configured fixed data structure mapping logical memory addresses to physical memory locations of the first and second disk media surfaces, wherein the data structure comprises a first portion corresponding to the first logical unit and maps the first logical unit to physical memory locations of the first disk media surfaces and a portion of physical memory locations of the second disk media surfaces, sending a command to the second actuator assembly to execute at least a portion of the TO operation involving the portion of physical memory locations of the second disk media surfaces mapped to the first logical unit of memory assigned to the first actuator assembly;
  the second actuator assembly executing the portion of the TO operation involving the portion of physical memory locations of the second disk media surfaces mapped to the first logical unit of memory assigned to the first actuator assembly; and
  returning to the host a response identified as from the first logical unit.

10. The method of claim 9, further comprising:
  reducing power to the first actuator assembly to reduce input/output operations per second (IOPS) of the first actuator assembly.

11. The method of claim 9, wherein the portion of physical memory locations of the second disk media surfaces corresponds to an entire host-addressable surface of one of the second disk media.

12. The method of claim 9, wherein the portion of physical memory locations of the second disk media surfaces corresponds to a respective band of host-addressable memory addresses on one or more of the second disk media surfaces.

13. The method of claim 9, wherein the portion of physical memory locations of the second disk media surfaces corresponds to a respective inner-diameter band of host-addressable memory addresses on each of the second disk media surfaces.

14. The method of claim 13, further comprising:
  in response to a configuration request for a limited partition of memory for host workload, based on the fixed data structure:
    allocating a respective outer diameter band of host-addressable memory addresses on the first disk media surfaces to the physical memory locations of the first disk media surfaces of the first logical unit; and
    allocating a respective outer diameter band of host-addressable memory addresses on the second disk media surfaces to the physical memory locations of the second disk media surfaces of the second logical unit.

15. A controller circuitry for an asymmetric multi-actuator hard disk drive, wherein a first actuator assembly is configured to operate on a corresponding first number of first disk media surfaces and a second actuator assembly is configured to operate on a corresponding higher second number of second disk media surfaces, the controller circuitry storing or accessing one or more sequences of instructions which, when executed by one or more processors, cause performance of:

receiving from a host an input/output (TO) operation request addressed to a host-addressable first logical unit of memory assigned to the first actuator assembly;

based on a fixed data structure mapping logical memory addresses to physical memory locations of the first and second disk media surfaces, wherein the data structure comprises a first portion corresponding to the first logical unit and maps the first logical unit to physical memory locations of the first disk media surfaces and a portion of physical memory locations of the second disk media surfaces, sending a command to the second actuator assembly to execute at least a portion of the IO operation corresponding to the portion of physical memory locations of the second disk media surfaces mapped to the first logical unit of memory assigned to the first actuator assembly;

the second actuator assembly executing the portion of the TO operation corresponding to the portion of physical memory locations of the second disk media surfaces mapped to the first logical unit of memory assigned to the first actuator assembly; and returning to the host a response identified as from the first logical unit.

16. The controller circuitry of claim 15, wherein the one or more sequences of instructions which, when executed by one or more processors, cause further performance of:

reducing power to the first actuator assembly thereby reducing input/output operations per second (IOPS) of the first actuator assembly.

17. The controller circuitry of claim 15, wherein the portion of physical memory locations of the second disk media surfaces corresponds to an entire host-addressable surface of one of the second disk media.

18. An asymmetric multi-actuator hard disk drive comprising the controller circuitry of claim 17.

19. The controller circuitry of claim 15, wherein the portion of physical memory locations of the second disk media surfaces corresponds to a respective band of host-addressable memory addresses on each of the second disk media surfaces.

20. The controller circuitry of claim 15, wherein the portion of physical memory locations of the second disk media surfaces corresponds to a respective inner-diameter band of host-addressable memory addresses on each of the second disk media surfaces.

21. An asymmetric multi-actuator hard disk drive comprising the controller circuitry of claim 20.

22. The controller circuitry of claim 20, wherein the one or more sequences of instructions which, when executed by one or more processors, cause further performance of:

in response to a configuration request for a limited partition of memory for host workload, based on the fixed data structure:

allocating a respective outer diameter band of host-addressable memory addresses on the first disk media surfaces to the physical memory locations of the first disk media surfaces of the first logical unit; and allocating a respective outer diameter band of host-addressable memory addresses on the second disk media surfaces to the physical memory locations of the second disk media surfaces of the second logical unit.

23. A data storage device comprising:

a first actuator assembly associated with a host-addressable first logical unit and configured to operate on a corresponding first set of disk media surfaces;

a second actuator assembly associated with a host-addressable second logical unit and configured to operate on a corresponding second set of disk media surfaces greater than the first set; and a controller configured to:

receive an input/output (TO) operation request addressed to the first logical unit, send a command to the second actuator assembly to execute at least a portion of the TO operation at a parasitic portion of the second set of disk media surfaces assigned to the first logical unit associated with the first actuator assembly, and in response to the second actuator assembly executing the portion of the TO operation at the parasitic portion of the second set of disk media surfaces, returning a response to the TO operation request which is identified as from the first logical unit.

* * * * *